(12) United States Patent
Hoshino et al.

(10) Patent No.: US 9,739,037 B2
(45) Date of Patent: Aug. 22, 2017

(54) CONSTRUCTION MACHINE

(71) Applicant: Hitachi Construction Machinery Co., Ltd., Tokyo (JP)

(72) Inventors: Masatoshi Hoshino, Ibaraki (JP); Shinji Ishihara, Ibaraki (JP); Kentarou Itoga, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/849,758

(22) Filed: Sep. 10, 2015

(65) Prior Publication Data

US 2016/0076227 A1  Mar. 17, 2016

(30) Foreign Application Priority Data

Sep. 12, 2014  (JP) ................................. 2014-187018

(51) Int. Cl.
*E02F 9/20* (2006.01)
*E02F 9/22* (2006.01)
(Continued)

(52) U.S. Cl.
CPC ............ *E02F 9/2075* (2013.01); *B60L 1/003* (2013.01); *B60L 11/14* (2013.01); *B60L 11/1851* (2013.01); *B60L 15/20* (2013.01); *B60W 10/00* (2013.01); *B60W 10/06* (2013.01); *B60W 10/08* (2013.01); *B60W 20/106* (2013.01); *E02F 9/2217* (2013.01); *E02F 9/2246* (2013.01); *B60L 2200/40* (2013.01); *B60L 2240/421* (2013.01);
(Continued)

(58) Field of Classification Search
None
See application file for complete search history.

(56) References Cited

U.S. PATENT DOCUMENTS

| 9,004,206 | B2 * | 4/2015 | Kawaguchi ........... F02D 41/021 180/65.265 |
| 2009/0320461 | A1 * | 12/2009 | Morinaga ................. B66F 9/22 60/431 |
| 2011/0167811 | A1 | 7/2011 | Kawaguchi et al. |

FOREIGN PATENT DOCUMENTS

JP  2003028071 A  1/2003

OTHER PUBLICATIONS

European Supplementary Search Report for Application No. 15020152.3, dated Mar. 23, 2016.

* cited by examiner

*Primary Examiner* — Rami Khatib
(74) *Attorney, Agent, or Firm* — Crowell & Moring LLP

(57) ABSTRACT

A construction machine includes an engine, a load estimation unit that estimates a pump power absorption, a regeneration/powering power demand calculation unit that calculates a regeneration/powering power demand according to a state of charge in an electrical storage device, an engine power demand calculation unit that calculates an engine power demand based on the power absorption and regeneration/powering power demand, and a motor generator control unit that performs rotational speed control or torque control. The control unit includes a control switching unit that switches the rotational speed and the torque control according to the engine power demand and the rotational speed of the engine. The control switching unit switches from the torque control to the rotational speed control when during performance of the torque control, the engine power demand increases and the rotational speed of the engine becomes lower than a predetermined rotational speed.

4 Claims, 11 Drawing Sheets

(51) Int. Cl.
*B60W 10/04* (2006.01)
*B60W 10/06* (2006.01)
*B60W 10/08* (2006.01)
*B60W 20/00* (2016.01)
*B60L 11/14* (2006.01)
*B60L 1/00* (2006.01)
*B60L 11/18* (2006.01)
*B60L 15/20* (2006.01)
*B60W 10/00* (2006.01)

(52) U.S. Cl.
CPC ... *B60L 2240/423* (2013.01); *B60L 2240/441* (2013.01); *B60L 2240/443* (2013.01); *B60W 2510/0638* (2013.01); *B60W 2510/0657* (2013.01); *B60W 2510/081* (2013.01); *B60W 2510/083* (2013.01); *B60W 2510/244* (2013.01); *B60W 2510/305* (2013.01); *B60W 2710/0644* (2013.01); *B60W 2710/0666* (2013.01); *B60W 2710/0677* (2013.01); *B60W 2710/081* (2013.01); *B60W 2710/083* (2013.01); *B60W 2710/086* (2013.01); *Y02T 10/645* (2013.01); *Y02T 10/70* (2013.01); *Y02T 10/7005* (2013.01); *Y02T 10/705* (2013.01); *Y02T 10/7077* (2013.01); *Y02T 10/7275* (2013.01); *Y10S 903/93* (2013.01)

FIG. 7

| PUMP POWER ABSORPTION | ENGINE POWER DEMAND | TORQUE DEMAND TO MOTOR GENERATOR (DEMAND OPERATION) | TORQUE OF MOTOR GENERATOR | OPERATION STATE OF ENGINE |
|---|---|---|---|---|
| P1 | L1 | G1 (REGENERATION) | G(>G1) | E3 |
| P1 | L2 | G2 (REGENERATION) | G(<G2) | E3 |
| P2 | L1 | D1 (POWERING) | D(<D1) | E3 |
| P2 | L2 | D2 (POWERING) | D(>D2) | E3 |
| P2 | L3 | G3 (REGENERATION) | D (POWERING) | E3 |

CONSTRUCTION MACHINE

CROSS-REFERENCE TO RELATED APPLICATION

This application claims the priority of Japanese Patent Application 2014-187018 filed Sep. 12, 2014, which is incorporated herein by reference.

BACKGROUND OF THE INVENTION

1. Field of the Invention

This invention relates to a construction machine provided with a hybrid system that drives a hydraulic pump by an engine and a motor generator.

2. Description of the Related Art

In construction machines with a hybrid system of this type applied thereto, that is, in so-called hybrid construction machines, there is known a technology that assists the power of an engine by allowing a motor generator to perform powering with electric power of an electrical storage device when a load associated with an operation of a vehicle body is large but charges the electrical storage device by allowing the motor generator to regenerate with the engine when a load associated with an operation of the vehicle body is small.

As another one of conventional technologies on hybrid construction machines, there is known a technology that includes an engine control means and a motor generation control means. The engine control means controls an operation of an engine, and the motor generation control means controls an operation of a motor generator. The engine control means allows the engine to operate with droop characteristics that its torque increases at a certain constant rate as its rotational speed decreases. The motor generation control means gives a target rotational speed to the motor generator, whereby the motor generator is allowed to operate under rotational speed control that performs control to allow the motor generator to generate a torque such that the rotational speed of the engine coincides with a target rotational speed (see, for example, JP2003-28071A).

Described specifically, according to the hybrid construction machine of this conventional technology, the motor generation control means gives a rotational speed, which corresponds to a region of high fuel economy and low emission in the operation characteristics (rotational speed-torque characteristics) of the engine, as a target rotational speed to the motor generator, so that the motor generator is allowed to operate primarily under rotational speed control. By the engine control means, the engine is allowed to produce at this time a torque corresponding to the controlled rotational speed according to the droop characteristics. It is, therefore, possible to always keep the rotational speed and torque of the engine in the region of high fuel economy and low emission even if the load associated with an operation of the vehicle body varies.

SUMMARY OF THE INVENTION

With the hybrid construction machine of the conventional technology as disclosed in JP2003-28071A, the rotational speed and torque of the engine can be controlled to the desired region by the engine control means and motor generation control means as mentioned above provided that transitional behaviors are averaged and evaluated over a sufficient time interval. If an evaluation is made on behaviors over such a short time interval as corresponding to a cycle of combustion in each cylinder of the engine, however, the rotational speed and torque of the engine may significantly fluctuate in the desired region even when the rotational speed and torque are in the desired region.

Here, a torque of the engine is produced by combustion in each cylinder, and rotation of the engine accelerates shortly after the combustion but decelerates in a compression stroke. The rotational speed of the engine, therefore, fluctuates in the cycle of combustion in each cylinder. In other words, the engine can produce a torque only in the combustion stroke of each cylinder, and therefore the rotational speed of the engine inevitably fluctuates even when it is constant on average.

In the hybrid construction machine of the conventional technology, the engine control means generally has a grasp of the timing at which combustion takes place in each cylinder of the engine, so that any fluctuation component of the rotational speed of the engine can be eliminated if it is not large. The rotational speed and torque of the engine, from which fluctuation components have been eliminated in droop characteristics, correspond one to one accordingly. On the other hand, the motor generation control means cannot have a grasp of the timing at which combustion takes place in each cylinder of the engine. By measuring the rotational speed of the engine with such a fluctuation component contained therein and performing rotational speed control to bring the rotational speed of the motor generator into coincidence with a target rotational speed (substantially constant), the torque of the motor generator, therefore, fluctuates even when a load associated with an operation of the vehicle body is constant.

Fluctuations in the torque of the motor generator lead to large fluctuations in the rotational speed of the engine. As a result, the rotational speed of the engine fluctuates to such an extent that the engine control means cannot eliminate the fluctuation component. The torque of the engine, which corresponds to the rotational speed of the engine in the droop characteristics, then fluctuates, and in association with this fluctuation of the torque, the rotational speed of the engine fluctuates to a greater extent. As is appreciated from the foregoing, the rotational speed control by the motor generation control means amplifies the fluctuations in rotational speed and torque as associated with combustion in each cylinder of the engine, and therefore the hybrid construction machine of the conventional technology involves a concern about the occurrence of hunting that the rotational speed and torque of the engine do not remain stable but repeat varying.

With such realities of the conventional technology in view, the present invention has as an object thereof the provision of a construction machine that can suppress the occurrence of hunting in the operation control of an engine.

To achieve the above-described object, the present invention provides, in one aspect thereof, a construction machine provided with an engine, a motor generator that performs a power assist to the engine and electricity generation, an electrical storage device that performs a transfer of electric power with the motor generator, a hydraulic pump that is driven by the engine and motor generator, a rotational speed sensing device that detects an actual rotational speed of the engine, an engine controller that performs, based on the actual rotational speed of the engine as detected by the rotational speed sensing device and a target rotational speed for the engine, control to produce a torque from the engine, and a vehicle body controller that controls an operation of a vehicle body, wherein the vehicle body controller includes a load estimation unit that estimates a power absorption by the hydraulic pump, a regeneration/powering power demand calculation unit that according to a state of charge in the electrical storage device, calculates a power demand for a regenerative operation or powering operation of the motor generator, an engine power demand calculation unit that calculates a power demand to the engine based on the power absorption estimated by the load estimation unit and the power calculated by the regeneration/powering power demand calculation unit, and a motor generator control unit configured to perform rotational speed control, which makes the motor generator generate a torque based on a target rotational speed for the motor generator, or torque control, which makes the motor generator generate a torque based on a target torque for the motor generator; the motor generator control unit has a control switching unit configured to switch the rotational speed control and the torque control according to the power calculated by the engine power demand calculation unit and the actual rotational speed of the engine as detected by the rotational speed sensing device; and the control switching unit is configured to switch from the torque control to the rotational speed control when during the performance of the torque control, the power demand to the engine increases and the actual rotational speed of the engine becomes lower than a predetermined first rotational speed.

According to the present invention configured as described above, when during the performance of torque control by the motor generator control unit, the power demand to the engine increases and the torque of the engine increases to a maximum torque, the rotational speed of the engine then decreases. In other words, lug-down of the engine occurs. When the rotational speed of the engine then becomes lower than the predetermined first rotational speed, the control switching unit of the motor generator control unit switches the operation control of the motor generator from the torque control to the rotational speed control, and as a result, the motor generator produces a torque based on the target rotational speed of the motor generator. The engine, therefore, can maintain the state of the maximum torque even if the rotational speed of the engine fluctuates. Because fluctuations in the torque of the engine as associated with fluctuations in the rotational speed of the engine are allowed to remain small owing to the characteristics of the engine in the state of such a maximum torque of the engine, the rotational speed and torque of the engine can be stabilized. As a consequence, it is possible to suppress the occurrence of hunting in the operation control of the engine.

In the above-described invention, the control switching unit may preferably be configured to switch from the rotational speed control to the torque control when the power demand to the engine becomes smaller than a predetermined power during the performance of the rotational speed control.

According to the present invention configured as described above, when the power demand to the engine becomes smaller than the predetermined power during the performance of rotational speed control by the motor generator control unit, the control switching unit of the motor generator control unit switches the operation control of the motor generator from the rotational speed control to the torque control, whereby the torque of the engine can be promptly decreased to the maximum torque or less. It is, therefore, possible to reduce the load on the engine while avoiding over-charging of the electrical storage device.

In the above-described invention, the motor generator control unit may preferably be configured to set the target rotational speed for the motor generator at a rotational speed lower than the target rotational speed for the engine during the performance of the rotational speed control. When configured as described above, the rotational speed of the engine remains lower than the target rotational speed while the rotational speed control is being performed by the motor generator control unit. The engine can, therefore, stably maintain the state of the maximum torque irrespective of fluctuations in the torque of the motor generator.

In the above-described invention, the engine controller may preferably be configured to allow the engine to operate with governor characteristics that corresponding to a reduction in the rotational speed of the engine, the torque of the engine increases at a predetermined inclination; and the motor generator control unit may preferably be configured to decrease the target torque for the motor generator when during the performance of the torque control, the actual rotational speed of the engine becomes higher than a predetermined second rotational speed in a state that the target torque for the motor generator is set at a target torque corresponding to a powering operation.

According to the present invention configured as described above, even if an excessive torque is set in error relative to the target torque for the motor generator corresponding to the powering operation while the torque control is being performed by the motor generator control unit, the target torque for the motor generator decreases at the time point that the rotational speed of the engine has become higher than the predetermined second rotational speed. It is, therefore, possible to suppress the engine from excessive rotation that would otherwise takes place by the occurrence of an extra torque from the motor generator. As a consequence, over-speed of the engine can be prevented.

In the above-described invention, the vehicle body controller may preferably be provided with a torque estimation unit that estimates the torque of the engine; the engine controller may preferably be configured to allow the engine to produce a torque such that the rotational speed of the engine comes into coincidence with the target rotational speed for the engine; and the motor generator control unit may preferably be configured to decrease the target torque for the motor generator when during the performance of the torque control, the torque estimated by the torque estimation unit becomes smaller than the predetermined torque in a state that the target torque for the motor generator is set at a target torque corresponding to a powering operation.

According to the present invention configured as described above, even if an excessive torque is set in error relative to the target torque for the motor generator corresponding to the powering operation while the torque control is being performed by the motor generator control unit, the target torque for the motor generator decreases at the time point that the torque estimated by the torque estimation unit has become smaller than the predetermined torque. It is, therefore, possible to suppress the engine from excessive rotation that would otherwise takes place by the occurrence of an extra torque from the motor generator. As a consequence, over-speed of the engine can be prevented.

According to the construction machine of the present invention, the operation control of the motor generator is switched from the torque control to the rotational speed control by the control switching unit of the motor generator control unit when during the performance of the torque control, the power demand to the engine has increased and the rotational speed of the engine has become lower than the predetermined first rotational speed. Accordingly, the engine can maintain the state of the maximum torque, and the rotational speed and torque of the engine can be stabilized.

As a consequence, it is possible to suppress the occurrence of hunting in the operation control of the engine, and hence to improve the emission and fuel economy performance of the engine over the above-described conventional technology.

BRIEF DESCRIPTION OF THE DRAWINGS

FIG. 7 is a table showing relationships among pump power absorptions, engine power demands, torque demands to the motor generator, torques of the motor generator and an operation state of the engine during an operation of the motor generator when the state of operation control of the motor generator by the motor generator control unit in FIG. 3 is the state S2.

DETAILED DESCRIPTION OF PREFERRED EMBODIMENTS

Preferred embodiments of the construction machine according to the present invention will hereinafter be described with reference to the accompanying drawings.

First Embodiment

Figure 1:
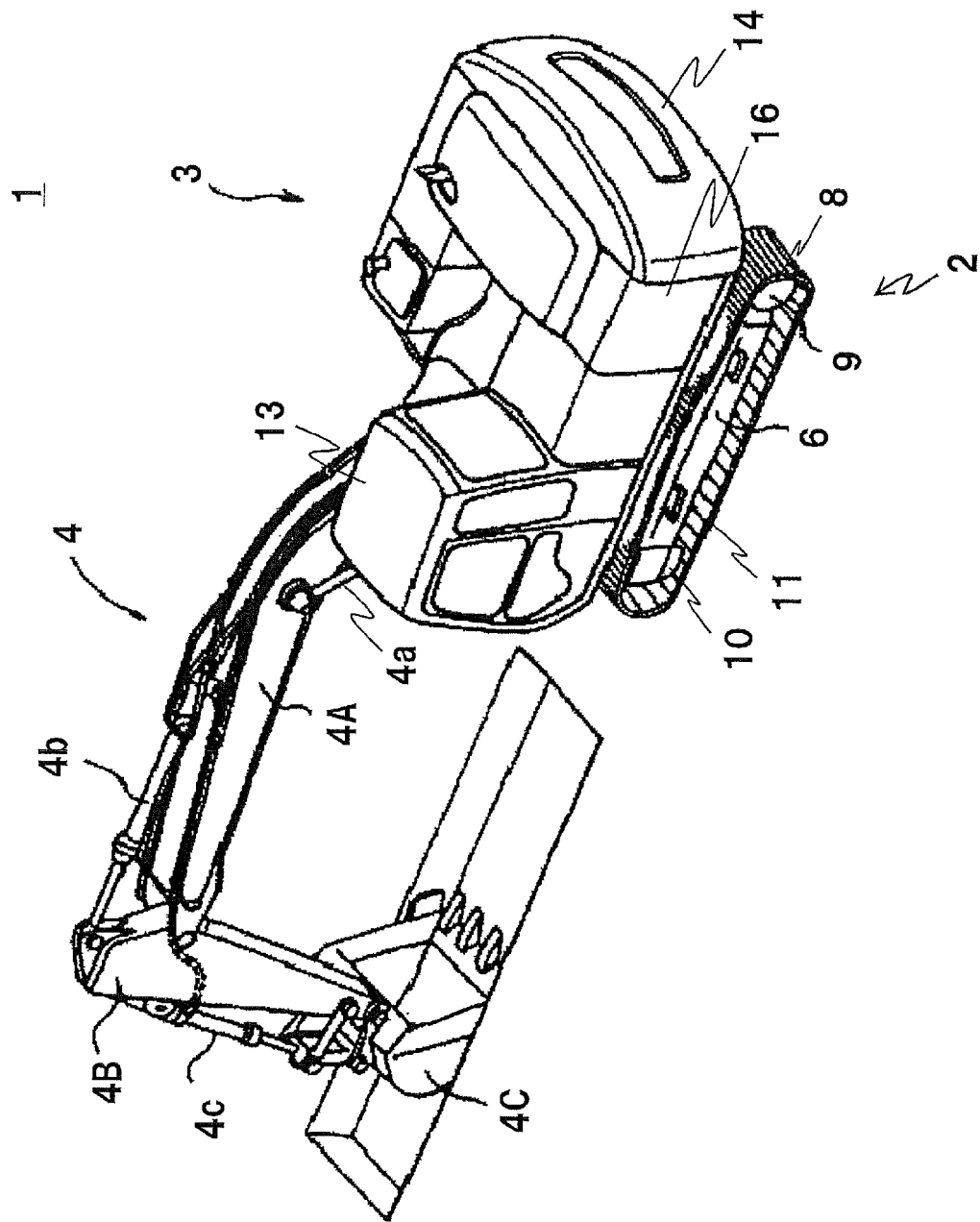
FIG. 1 is a perspective view illustrating an external appearance of a hybrid hydraulic excavator as an example of a construction machine to which the present invention can be applied.

The first embodiment of the construction machine according to the present invention is applied, for example, to a hybrid hydraulic excavator (hereinafter called "the hydraulic excavator" for the sake of convenience) 1 illustrated in FIG. 1. This hydraulic excavator 1 is provided with a travel base 2, an upperstructure 3 turnably mounted on the travel base 2 via a revolving frame (not shown), and an articulated front working mechanism 4 attached to a front of the upperstructure 3 and pivotable in an up-down direction to perform work such as digging.

The travel base 2 includes a crawler track frame 6, a swing motor 7 (see FIG. 2), a sprocket (drive wheel) 8, a travel motor 9, an idler (idler wheel) 10, and a crawler track 11. The swing motor 7 is disposed on the crawler track frame 6 and turns the upperstructure 3. The sprocket 8 is secured to an end, as viewed along a front-rear direction, of the crawler track frame 6 and is rotationally driven. The travel motor 9 rotates this sprocket 8. The idler 10 is rotatably secured to an opposite end, as viewed along the front-rear direction, of the crawler track frame 6. The crawler track 11 is endlessly wrapped around outer peripheries of these sprocket 8 and idler 10. When the sprocket 8 is rotationally driven, the crawler track 11 rotates while being brought into engagement with the ground, whereby the vehicle body moves.

The upperstructure 3 is provided with a cab 13 disposed in a front section, a counterweight 14 disposed in a rear section to maintain the weight balance of the vehicle body, an engine compartment 16 disposed in a rear section and accommodating therein an engine 15 (see FIG. 2) to be described subsequently herein, and an actuator drive control system 17 (see FIG. 2) disposed between the cab 13 and the engine compartment 16. The actuator drive control system 17 controls driving of actuators for the swing motor 7, travel motor 9, and a boom cylinder 4a, arm cylinder 4b, bucket cylinder 4c and the like to be described subsequently herein.

The front working mechanism 4 includes a boom 4A pivotally secured at a basal end thereof to the swing frame and pivotable in the up-down direction, an arm 4B pivotally secured to a free end of the boom 4A, and a bucket 4C pivotally secured to a free end of the arm 4B. In addition, the front working mechanism 4 also includes a boom cylinder 4a, an arm cylinder 4b, and a bucket cylinder 4c. The boom cylinder 4a connects the upperstructure 3 and the boom 4A, and extends or retracts to pivot the boom 4A. The arm cylinder 4b connects the boom 4A and the arm 4B, and extends or retracts to pivot the arm 4B. The bucket cylinder 4c connects the arm 4B and the bucket 4C, and extends or retracts to pivot the bucket 4C. Individual operations of the boom 4A, arm 4B, bucket 4C and upperstructure 3 are instructed by hydraulic control signals (control pilot pressures) from control lever devices 24A,24B to be described subsequently herein, while an operation of the travel base 2 is instructed by a hydraulic control signal (control pilot pressure) from a travel control pedal device to be described subsequently herein.

Figure 2:
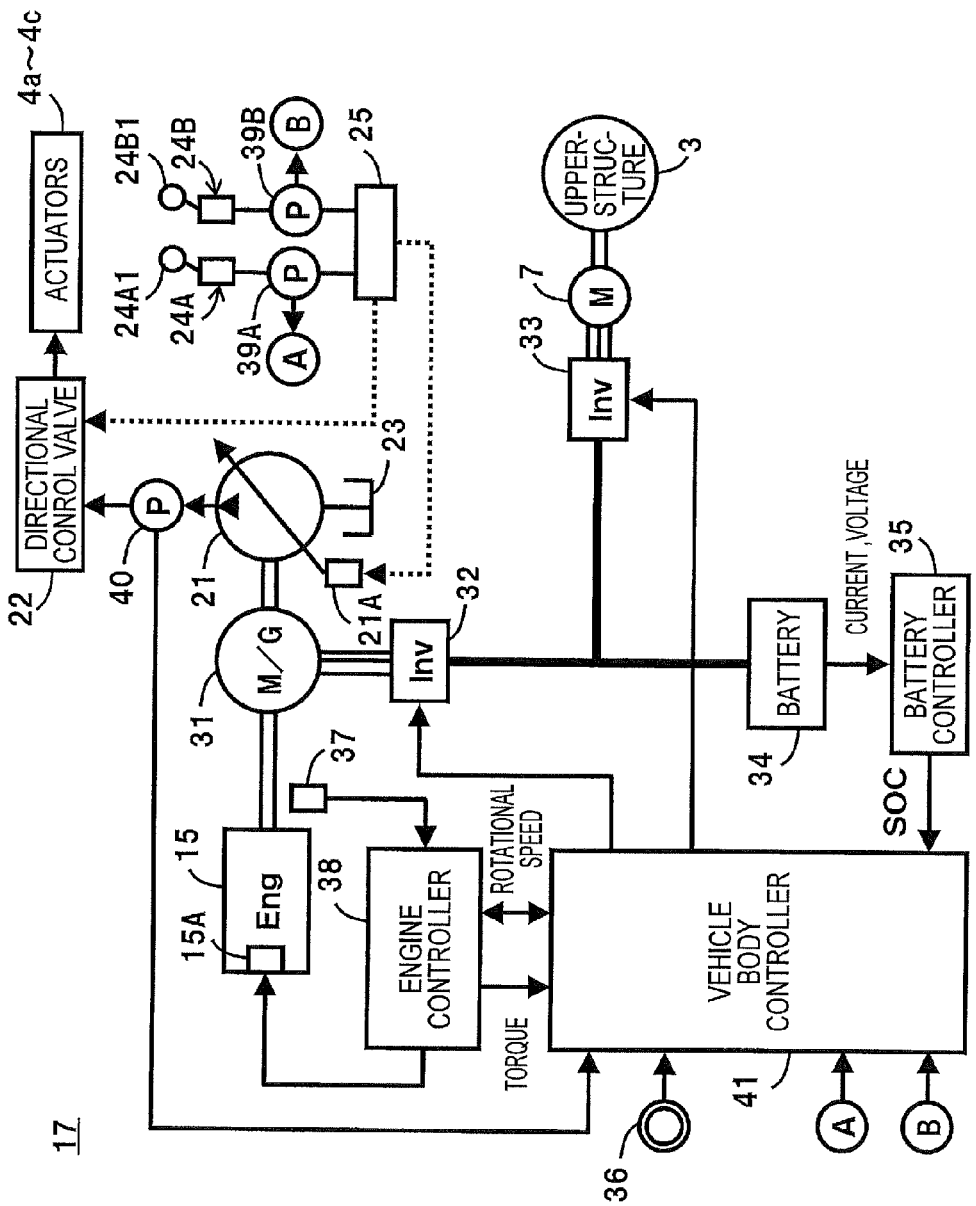
FIG. 2 is a block diagram illustrating the configuration of a hybrid hydraulic excavator according to the first embodiment of the present invention.

With reference to FIG. 2, a description will next be made about the configuration of the actuator drive control system 17 mounted on the upperstructure 3.

As illustrated in FIG. 2, the actuator drive control system 17 includes the engine 15, a hydraulic pump 21, a directional control valve 22, a pilot pump (not shown), a hydraulic oil tank 23, the control lever devices 24A,24B, the travel control pedal device (not shown), and a shuttle valve block 25. The hydraulic pump 21 is driven by the engine 15. The directional control valve 22 controls a flow of pressure oil delivered by the hydraulic pump 21. The pilot pump supplies hydraulic oil as pilot pressure oil to the directional control valve 22. The hydraulic oil tank 23 stores hydraulic oil to be supplied to the hydraulic pump 21 and pilot pump. The control lever devices 24A,24B are arranged in the cab 13, and include control levers 24A1,24B1 which enable desired operations of the actuators 4a-4c, 7 and are held and operated by an operator in the cab 13. The travel control pedal device is arranged in the cab 13, and includes control pedals (not shown) which enable a desired operation of the travel base 2 and are depressed and operated by the operator in the cab 13. The shuttle valve block 25 is connected at an inlet side thereof to the control lever devices 24A,24B and travel control pedal device, and is connected at an outlet side thereof to the below-described pressure receiving chamber of the directional control valve 22.

The engine 15 includes an electronic governor 15A that adjusts the fuel injection quantities to respective cylinders inside the engine 15. The hydraulic pump 21 can be, for example, a variable displacement hydraulic pump. The hydraulic pump 21 includes a swash plate (not shown), and a regulator 21A of the positive control system that adjusts the displacement of the swash plate to control the flow rate of pressure oil to be delivered.

This regulator 21A is electrically connected to the shuttle valve block 25. The delivery flow rate of the hydraulic pump 21 is configured to increase by increasing the displacement (capacity) of the swash plate of the hydraulic pump 21 as the strokes (flow-rate demands) of the control levers 24A1, 24B1 and control pedals, as operation members of the control lever devices 24A, 24B and travel control pedal device increase and the hydraulic control signals received through the shuttle valve block 25 rise. It is to be noted that, although not illustrated in the figure, the regulator 21A has a torque-limit controlling function to decrease the displacement (capacity) of the hydraulic pump 21 with the delivery pressure of the hydraulic pump 21, thereby controlling the torque absorption of the hydraulic pump 21 such that it does not exceed a maximum torque set beforehand.

The directional control valve 22 can be, for example, an open-center spool valve arranged in a center bypass line, and makes up a hydraulic circuit between the hydraulic pump 21 and the actuators 4a-4c. Although not illustrated in the figure, the directional control valve 22 includes a spool and a pressure receiving chamber. The spool strokes within a housing that forms an outer shell, whereby the flow rate and direction of pressure oil delivered from the hydraulic pump 21 are adjusted. On the pressure receiving chamber, a control pilot pressure from the shuttle valve block 25 acts to change the stroke of the spool.

The control lever devices 24A,24B and travel control pedal device each produce a control pilot pressure (hydraulic control signal) by reducing a primary pressure, which has been produced with pressure oil delivered from the pilot pump, to a secondary pressure according to an operated opening of a reducing valve (remote control valve) arranged in the corresponding device. This control pilot pressure is delivered to the pressure receiving chamber of the directional control valve 22 to switchingly operate the directional control valve 22 from the neutral position. The shuttle valve block 25 selects one of hydraulic pressure signals (specifically, hydraulic pressure signals for the boom 4A, arm 4B and bucket 4C) produced by the control levers 24A1, 24B1 other than a hydraulic control signal, which instructs a swing operation, and a hydraulic control signal produced by the travel control pedal device, said selected hydraulic pressure signal having the highest pressure, and outputs the selected hydraulic pressure signal to the regulator 21A.

Further, the actuator drive control system 17 is also provided with a motor generator (M/G) 31, the above-described swing motor (M) 7, inverters 32,33, a battery 34, and a battery controller 35. The motor generator (M/G) 31 is disposed on a drive shaft of the engine 15, and a torque is transferred between the motor generator (M/G) 31 and the engine 11 to perform a power assist to the engine 11 or electricity generation. The swing motor (M) 7 drives the upperstructure 3. The inverters 32,33 control operations of these motor generator 31 and swing motor 7. The battery 34 performs, as an electrical storage device, the transfer of electric power with the motor generator 31 and swing motor 7 via the inverters 32,33. The battery controller 35 controls the operation of the battery 34.

Furthermore, the actuator drive control system. 17 also includes a target rotational speed setting unit 36, a rotational speed sensor 37, an engine controller 38, pressure sensors 39A,39B, a delivery pressure sensor 40, and a vehicle body controller 41. The target rotational speed setting unit 36 sets a target rotational speed for the engine 15. The rotational speed sensor 37 serves as a rotational speed sensing device to detect the actual rotational speed of the engine 15. The engine controller 38 is connected to the rotational speed sensor 37 and electronic governor 15A, and controls the operation of the engine 15. The pressure sensors 39A,39B detect control pilot pressures reduced by the control lever devices 24A,24B and travel control pedal device. The delivery pressure sensor 40 is disposed between the hydraulic pump 21 and the directional control valve 22, and detects the delivery pressure of pressure oil delivered from the hydraulic pump 21. The vehicle body controller 41 is connected to the inverters 32,33, battery controller 35, target rotational speed setting unit 36, engine controller 38 and pressure sensors 39A, 39B, and performs the input and output of various signals with these devices to control the operation of the whole vehicle body.

The motor generator 31 is connected to the drive shaft of the engine 15 and a rotary shaft of the hydraulic pump 21, and has two functions, one being as a generator to convert power of the engine 15 to electric energy (electric power) and to output it to the inverter 32, and the other being as a motor to be driven by the electric energy (electric power) supplied from the inverter 32, to perform a power assist to the engine 15 and to drive the hydraulic pump 21. The swing motor 7 drives the upperstructure 3 by the electric energy (electric energy) supplied from the inverter 33. The swing motor 7 has a regeneration function to convert power, which has been produced at the time of braking of the upperstructure 3, to electric energy (electric power) and to output it to the inverter 33.

When the motor generator 31 functions as a generator, the inverter 32 converts AC power, which has been produced at the motor generator 31, to DC power and to output it to the battery 34 or inverter 33. When the motor generator 31 functions as a motor, on the other hand, the inverter 32 converts DC power, which has been supplied from the battery 34, to AC power and to supply it to the motor generator 31. When the regeneration function by the swing motor 7 is actuated, the inverter 33 converts AC power, which has been produced at the swing motor 7, to DC power and to output it to the battery 34. When the swing motor 7 drives the upperstructure 3, on the other hand, the inverter 33 converts DC power, which has been supplied from the battery 34 or inverter 32, to AC power and to supply it to the swing motor 7.

The battery 34 is inputted with a control instruction from the battery controller 35 and to supply and discharges DC power to the inverters 32,33. As an alternative, the battery 34 accumulates, in other words, is charged with DC power supplied from the inverters 32,33, so that the battery 34 stores electric energy produced at the motor generator 31 and electric energy regenerated at the swing motor 7. The battery controller 35 detects the voltage and electric current of the battery 34, and estimates the quantity of electric energy stored in the battery 34, that is, the state of charge (SOC) and inputs it in the vehicle body controller 41.

The target rotational speed setting unit 36 is arranged, for example, in the cab 13, and can be a target rotational speed setting dial that according to the details of work, selects a work mode such as an economy mode, which is a mode when light-load or medium-load work such as light digging work or grading work is performed, or a high-load mode which is a mode when work of a load higher than that for the economy mode is performed and that sets the target rotational speed for the engine 15 at a target rotational speed for the selected work mode.

The engine controller 38 is inputted with the target rotational speed for the engine 15 and an actual rotational speed of the engine 15 from the vehicle body controller 41 and rotational speed sensor 37, respectively, and calculates a difference between the target rotational speed for the engine 15 and the actual rotational speed of the engine 15. Then, the engine controller 38 calculates a target fuel injection quantity based on the difference so calculated, and corresponding to the target fuel injection quantity, outputs a control command to the electronic governor 15A. The governor 15A is actuated by the control command inputted from the engine controller 38, and injects and supplies fuel as much as the target fuel injection quantity to each cylinder of the engine 15.

As a consequence, control is performed to produce a torque from the engine 15 such that the rotational speed of the engine 15 is maintained at the target rotational speed. Further, the engine controller 38 performs control to operate the engine 15 with governor characteristics (see FIG. 5) such that the torque of the engine 15 increases at a predetermined inclination corresponding to a reduction in the rotational speed of the engine 15. In other words, the engine controller 38 performs droop control as operation control for the engine 15.

The vehicle body controller 41 includes a control calculation circuit 42 (see FIG. 3) that performs calculations with respect to control commands to be outputted to the respective devices, and performs, for example, the following control to the swing motor 7 and motor generator 31.

(1) Drive Control of the Swing Motor 7

The pressure sensor 39A is connected to a pilot oil line through which among the hydraulic control signals produced by the control lever device 24A, the hydraulic control signal that instructs a swing operation in a left-right direction is guided, and detects the hydraulic control signal in the pilot oil line. The vehicle body controller 41 is inputted with a detection signal (electric signal) from the pressure sensor 39A, and responsive to the hydraulic control signal detected by the pressure sensor 39A, performs drive control of the swing motor 7.

Described specifically, when the detection signal inputted from the pressure sensor 39A is a hydraulic control signal that instructs a swing operation in a left direction, the vehicle body controller 41 performs, based on the hydraulic control signal, generation control to allow the motor generator 31 to operate as a generator by controlling the operation of the inverter 32, and also performs powering control to drive the swing motor 7 as a motor by controlling the operation of the inverter 33. As a consequence, the swing motor 7 is operated by electric power supplied from the inverter 33 so that the upperstructure 3 swings leftward at a speed corresponding to the hydraulic control signal.

When the detection signal inputted from the pressure sensor 39A is a hydraulic control signal that instructs a swing operation in a right direction, on the other hand, the vehicle body controller 41 performs, based on the hydraulic control signal, generation control to allow the motor generator 31 to operate as a generator by controlling the operation of the inverter 32, and also performs powering control to drive the swing motor 7 as a motor by controlling the operation of the inverter 33. As a consequence, the swing motor 7 is operated by electric power supplied from the inverter 33 so that the upperstructure 3 swings rightward at a speed corresponding to the hydraulic control signal.

(2) Regeneration Control of the Swing Motor 7

At the time of braking to a swing operation of the upperstructure 3, the vehicle body controller 41 recovers electric energy from the swing motor 7 by performing generation control to control the operation of the inverter 33 such that the swing motor 7 is allowed to operate as a generator. The vehicle body controller 41 then accumulates the recovered electric energy in the battery 34 so that the state of charge in the battery 34 rises.

(3) Operation Control of the Motor Generator 31 (Electrical Storage Management Control of the Battery 34)

When the power absorption of the hydraulic pump 21, in other words, the load on the hydraulic pump 21 is low and the state of charge in the battery 34 as managed by the battery controller 35 is low, the vehicle controller 41 performs generation control for the inverter 32 to allow the motor generator 31 to operate as a generator. As a consequence, the motor generator 31 generates surplus electric power, so that a charging operation is performed by the battery 34 and the state of charge in the battery 34 increases.

When the power absorption of the hydraulic pump 21, in other words, the load on the hydraulic pump 21 is high and the state of charge in the battery 34 as managed by the battery controller 35 is higher than a predetermined quantity, on the other hand, the vehicle body controller 41 performs powering control for the inverter 32 to supply electric power from the battery 34 and to allow the motor generator 31 to operate as a motor. As a consequence, the motor generator 31 performs a power assist to the engine 15, so that the hydraulic pump 21 is driven by the engine 15 and motor generator 31. Accordingly, a discharging operation is performed by the battery 34 and the state of charge in the battery 34 decreases.

Figure 3:
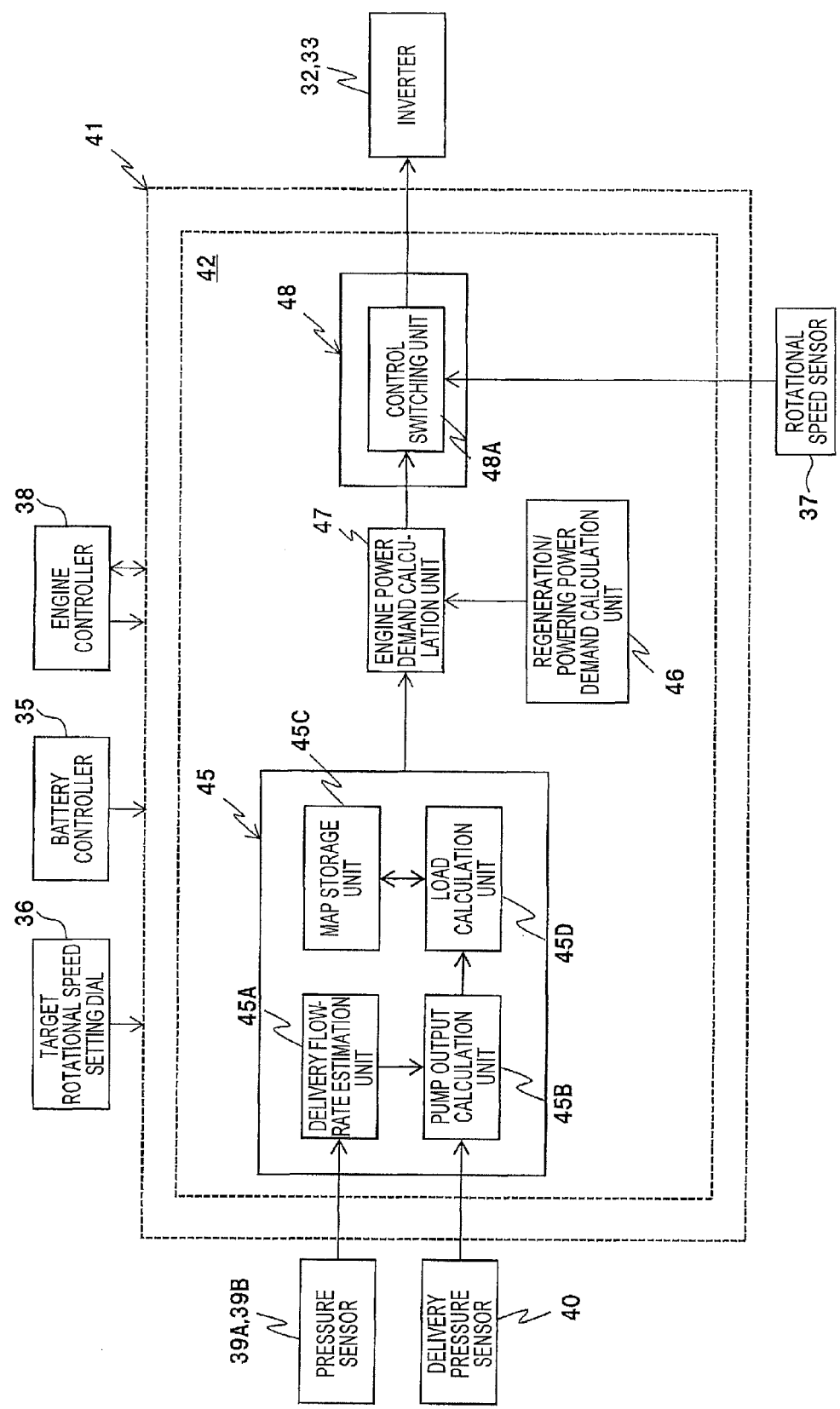
FIG. 3 is a block diagram illustrating the configuration of a control calculation circuit of a vehicle body controller in FIG. 2.

With reference to FIG. 3, a description will next be made in detail about the configuration of the control calculation circuit 42 of the vehicle body controller 41, which realizes operation control of the motor generator 31 while taking into consideration the electrical storage management control of the battery 34 as described above in (3).

As illustrated in FIG. 3, the control calculation circuit 42 of the vehicle body controller 41 is provided with a load estimation unit 45, a regeneration/powering power demand calculation unit 46, and an engine power demand calculation unit 47. The load estimation unit 45 estimates a power absorption of the hydraulic pump 21 (hereinafter called "the pump power absorption for the sake of convenience). The regeneration/powering power demand calculation unit 46 calculates, according to the state of charge in the battery 34, power required for a regenerative operation or powering operation of the motor generator 31 (hereinafter called "the regeneration/powering power demand" for the sake of convenience). The engine power demand calculation unit 47 calculates power demanded to the engine 15 (hereinafter called "the engine power demand") based on the pump power absorption estimated by the load estimation unit 45 and the regeneration/powering power demand calculated by the regeneration/powering power demand calculation unit 46.

The load estimation unit 45 includes a delivery flow-rate estimation unit 45A and a pump output calculation unit 45B. The delivery flow-rate estimation unit 45A estimates the delivery flow rate of the hydraulic pump 21, for example, based on the strokes of the control levers 24A1, 24B1 as obtained from detection signals of the pressure sensors 39A,39B. The pump output calculation unit 45B calculates a pump output, for example, by multiplying the delivery pressure detected by the delivery pressure sensor 40 with the delivery flow rate estimated by the delivery flow-rate estimation unit 45A.

In addition, the load estimation unit 45 also includes a map storage unit 45C and a load calculation unit 45D. The map storage unit 45C stores a map of pump efficiency and loss as functions of operation states of the hydraulic pump 21 such as the rotational speed, delivery pressure and delivery flow rate of the hydraulic pump 21. The load calculation unit 45D calculates a pump power absorption by dividing a pump output, which has been calculated by the pump output calculation unit 45B, with a pump efficiency obtained by referring to the map stored in the map storage unit 45C or by subtracting a loss, which has been obtained by referring the map stored in the map storage unit 45C, from a pump output calculated by the pump output calculation unit 45B.

Now assume that the reference value for the state of charge in the battery 34 is set to be, for example, 50% of its storage capacity. When the state of charge in the battery 34 is smaller than the reference value, the regeneration/powering power demand calculation unit 46 calculates, as a regeneration/powering power demand, regeneration power required to produce a regeneration torque based on the difference between the state of charge in the battery 34 and the reference value and the target rotational speed for the engine 15. When the state of charge in the battery 34 is greater than the reference value, on the other hand, the regeneration/powering power demand calculation unit 46 calculates, as a regeneration/powering power demand, powering power required to produce a powering torque based on the difference between the state of charge in the battery 34 and the reference value and the target rotational speed for the engine 15.

These regeneration torque and powering torque are target torques when the operation control of the motor generator 31 is torque control. By performing a regenerative operation and a powering operation according to these target torques, the state of charge in the battery 34 is adjusted to an appropriate range. It is to be noted that the sign of a regeneration/powering power demand is, for example, negative when the regeneration/powering power demand is a regeneration power demand, and positive when the regeneration/powering power demand is a powering power demand.

Now representing an engine power demand by L, a pump power absorption by P and a regeneration/powering power demand by Q, the engine power demand L is defined by the following formula (1):

$$L = P - Q \qquad (1)$$

When the regeneration/powering power demand Q becomes regeneration power Qg (>0)(Q=−Qg), Q takes a negative value in the formula (1) so that the engine 15 produces power which is obtained by adding the pump power absorption P and the regeneration power Qg. When the regeneration/powering power demand Q becomes powering power Qd (>0)(Q=Qd), on the other hand, Q takes a positive value in the formula (1) so that the engine 15 is only required to produce power which is obtained by subtracting the powering power Qd from the pump power absorption P. The production of the engine power demand L by the engine 15, therefore, makes it possible to obtain the appropriate pump power absorption P and also to meet the regeneration/powering power demand Q.

The engine power demand calculation unit 47 calculates the engine power demand L by substituting the pump power absorption P, which has been calculated by the load estimation unit 45D, and the regeneration/powering power demand Q, which has been calculated by the regeneration/powering power demand calculation unit 48, into the formula (1).

The control calculation circuit 42 is also provided with a motor generator control unit 48 that performs either the rotational speed control, which produces a torque from the motor generator 31 based on the target rotational speed for the motor generator 31, or the torque control, which produces a torque from the motor generator 31 based on the target torque for the motor generator 31. This motor generator control unit 48 includes a control switching unit 48A that switches the rotational speed control and the torque control according to the engine power demand L calculated by the engine power demand calculation unit 47 and the actual rotational speed of the engine 15 as detected by the rotational speed sensor 37.

Figure 4:
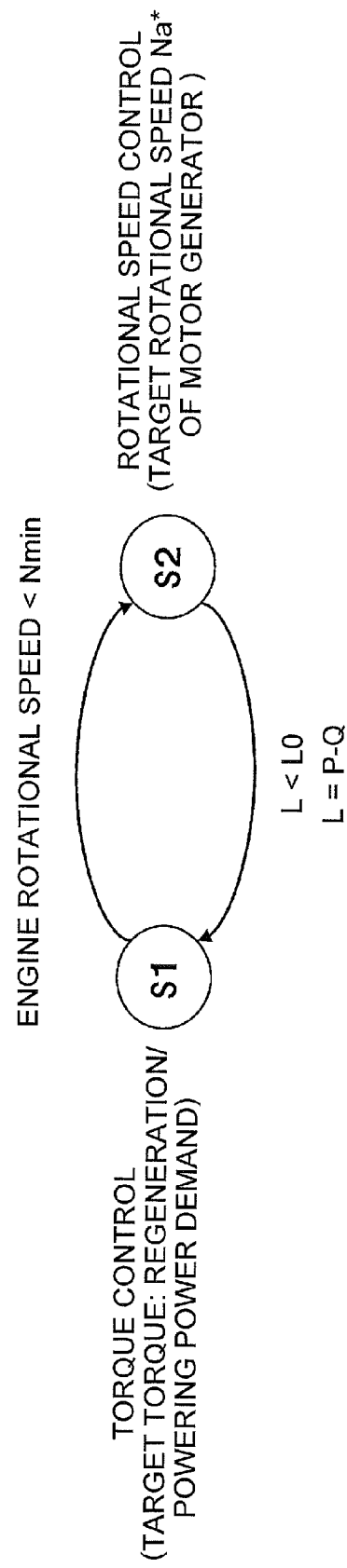
FIG. 4 is a diagram describing about switching operations between rotational speed control and torque control by a control switching unit in FIG. 3.

As illustrated in FIG. 4, this control switching unit 48A switches from the torque control to the rotational speed control when during the performance of the torque control (a state S1), the engine power demand L has increased and the rotational speed of the engine 15 has become lower than a predetermined first rotational speed Nmin, but switches from the rotational speed control to the torque control when during the performance of the rotational speed control (a state S2), the engine power demand L has become smaller than predetermined power (hereinafter called "the reference power" for the sake of convenience) L0. It is to be noted that the engine power demand L and regeneration/powering power demand Q have been defined as the power required for the engine 15 and the power required for the regenerative operation or powering operation of the motor generator 31, respectively, by the formula (1) but these demands are not met actually in many instances.

Figure 5:
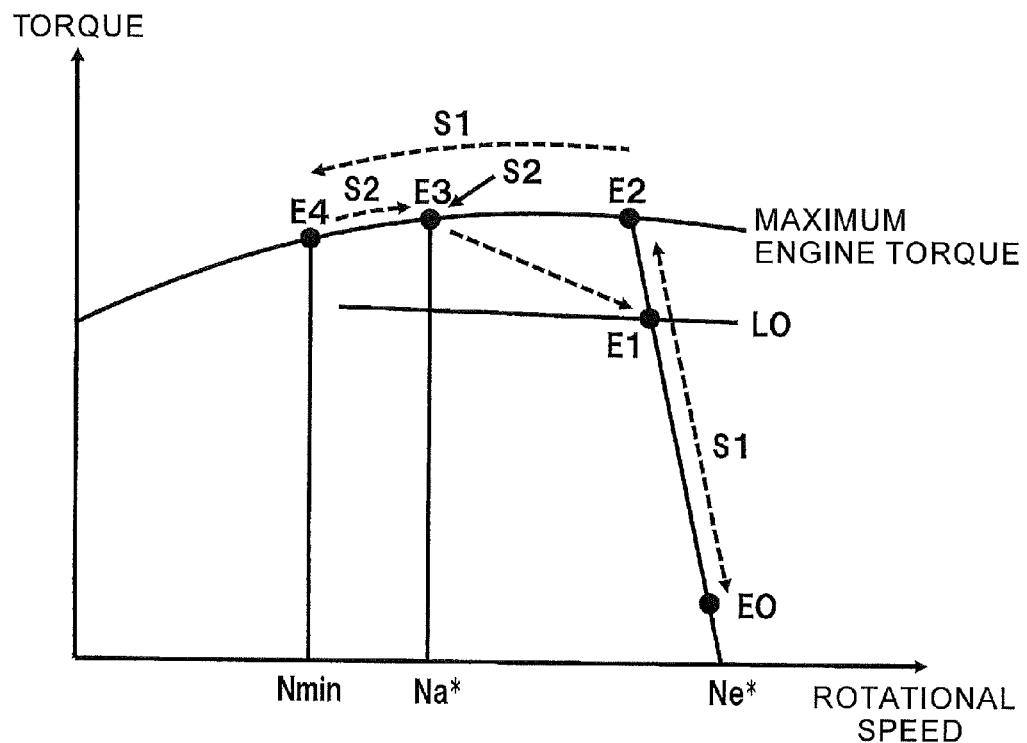
FIG. 5 is a rotational speed-torque characteristics diagram illustrating operation characteristics of an engine associated with the switching operations in FIG. 4.

With reference to FIG. 5, a description will next be made in detail about an operation of the engine 15 associated with operation control of the motor generator 31 by the control calculation circuit 42 of the vehicle controller 41, which has been configured as described above.

As illustrated in FIG. 5, the engine 15 operates under droop control by the engine controller 38 so that by the target rotational speed setting dial 36, the operator can specify a desired rotational speed according to the details of work under the assumption that the rotational speed, at which the torque of the engine 15 becomes 0 under no load, is a target rotational speed Ne* for the engine 15 (2,000 rpm as a specific example). When the control levers 24A1,24B1 and the travel control pedal are not operated while the motor generator 31 is producing no torque, the state of operation of the engine 15 is at an operating point E0 that corresponds to a drag or the like of the hydraulic pump 21. As the engine power demand L increases with the load on the hydraulic pump 21, in other words, with the pump power absorption P, the torque of the engine 15 also increases so that the state of operation of the engine 15 moves to an operating point E2 of the maximum torque. When the pump power absorption P increases further, the state of operation of the engine 15 changes along the maximum torque, and the rotational speed of the engine 15 decreases.

Now assuming that the initial state of operation control of the motor generator 31 by the motor generator control unit 48 is the state S1, a description will be made of a change of the state of operation control of the motor generator 31. When the operation control of the motor generator 31 is in the state S1, the motor generator control unit 48 performs torque control for the motor generator 31 so that irrespective of the rotational speed, the target torque is produced substantially as specified. As mentioned above, this target torque is calculated from the regeneration/powering power demand Q that has taken into consideration the state of charge in the battery 34.

When the motor generator 31 is performing regeneration, a torque obtained by adding a torque from regeneration by the motor generator 31 and a torque by a load on the hydraulic pump 21 is applied to the engine 15. When the motor generator 31 is performing powering, on the other hand, the engine 15 bears a torque obtained by subtracting a torque of the motor generator 31 from a torque of the hydraulic pump 21. Whichever the case may be, the engine 15 operates on and along a droop characteristic line from the operating point E0 to the operating point E2 when the torque applied as a load on the engine 15 is smaller than the maximum torque of the engine 15.

Therefore, the torque of the engine 15 also fluctuates according to the droop characteristics when the load on the engine 15 fluctuates. At this time, the load by the motor generator 31 is not fluctuated by the rotational speed, and moreover the torque control is performed. The rate of a change in the target torque can, therefore, be set in a range where no adverse effect is given to the charge-discharge management of the battery 34. It is, accordingly, possible to avoid increased fluctuations in the torque of the engine 15 by the motor generator 31, and hence deterioration of the emission and fuel economy performance of the engine 15, and moreover to facilitate the management of the state of charge in the battery 34.

When the load on the engine 15 subsequently increases with the state of operation of the engine 15 being located at the operating point E2, the rotational speed of the engine 15 decreases and the state of operation of the engine 15 changes from an operating point E3 to an operating point E4. When the load on the engine 15 then increases further and the rotational speed of the engine 15 becomes lower than the rotational speed Nmin at the operating point E4, the state of operation control of the motor generator 31 changes from the state S1 to the state S2, and the control switching unit 48A switches the operation control of the motor generator 31 from the torque control to the rotational speed control. By then setting the target rotational speed for the motor generator 31 at a rotational speed Na* lower than the target rotational speed Ne* for the engine 15 (1,980 rpm as a specific example) (Na*<Ne*), the motor generator control unit 48 controls the torque of the motor generator 31 such that the rotational speed of the motor generator 31 comes into coincidence with the target rotational speed Na*.

At this time, the rotational speed of the engine 15 does completely coincide with the target rotational speed Na*. When the state of operation control of the motor generator 31 is the state S2, however, the state of operation of the engine 15 is located around the operating point E3 and the rotational speed of the engine 15 is maintained lower than the target rotational speed Ne*. The engine 15 can, therefore, stably maintain the state of the maximum torque irrespective of fluctuations in the torque of the motor generator 31. As a consequence, the engine 15 can exhibit high performance in emission and fuel economy even if the fluctuations in the torque of the engine 15 increase by the motor generator 31. When the state of operation control of the motor generator 31 is the state S2, the engine 15 is operated at the target rotational speed Na* lower than the target rotational speed Ne* as mentioned above. However, substantially no effect is given to the torque or power of the engine 15 because the above-mentioned advantageous effect can be obtained sufficiently when the difference (20 rpm in the specific example) between these target rotational speed Ne* and target rotational speed Na* is, for example, as small as 1% or so of the rated rotational speed of the engine 15.

If the engine power demand L calculated by the engine power demand calculation unit 47 becomes smaller than reference power L0 when the state of operation control of the motor generator 31 is the state S2, the control switching unit 48A switches the control of operation of the motor generator 31 from the rotational speed control to the torque control so that the state of operation control of the motor generator 31 changes from the state S2 to the state S1. As a consequence, the torque of the engine 15 can be promptly decreased to the maximum torque or less, thereby making it possible to reduce the load on the engine 15 while preventing the occurrence of over-charging of the battery 34. As a consequence, it is possible to provide each of the engine 15 and battery 34 with a longer service life.

The above-mentioned state S2 is a state for allowing the engine 15 to surely and stably produce the maximum torque while assuring the rotational speed specified by the operator through the target rotational speed setting dial 36 or the rotational speed needed for the drive of the hydraulic pump 21. The change of the operation control of the motor generator 31 from the state S2 to the state S1 means a reduction in the engine power demand L. It is, therefore, only necessary to set the reference power L0, for example, at 80% or so of the maximum torque of the engine 15.

Figure 6:
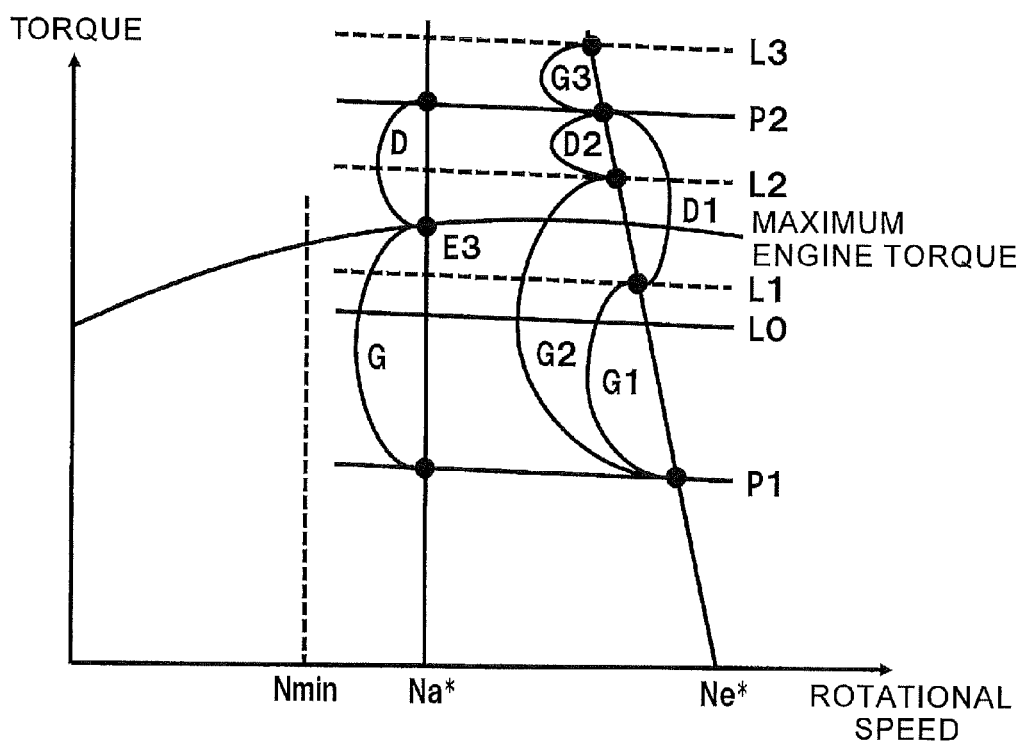
FIG. 6 is a diagram describing an operation of a motor generator when the state of operation control of the motor generator by a motor generator control unit in FIG. 3 is a state S2.

With reference to FIG. 6, a description will next be made in detail about an operation of the motor generator 31 when the state of operation control of the motor generator 31 is the state S2.

As the state of operation control of the motor generator 31 is the state S2, engine power demands L1 to L3 illustrated in FIG. 6 are assumed to be greater than the reference power L0 at which the switching of operation control of the motor generator 31 by the control switching unit 48A is performed. It is also assume that a pump power absorption P1 is smaller compared with the power corresponding to the maximum torque of the engine 15 and a pump power absorption P2 is greater compared with the power corresponding to the maximum torque of the engine 15. It is to be noted that the following description indicates about the following five cases in which these engine power demands L1 to L3 and pump power absorptions P1, P2 are combined.

As illustrated in FIG. 6, the motor generator 31 is required to produce a regenerative torque G1 as its operation if the engine power demand L is L1 when the pump power absorption P is P1. Actually, however, the engine power demand L1 is greater than the reference power L0 and the state of operation control of the motor generator 31 is maintained in the state S2. Therefore, the state of operation of the engine 15 is at the operating point E3, and the motor generator 31 produces a regenerative torque G from the operating point E3 to the pump power absorption P1. In this case, a regenerative torque G greater than the required regenerative torque G1 is obtained (G>G1).

The motor generator 31 is required to produce a regenerative torque G2 as its operation if the engine power demand L is L2 when the pump power absorption P is P1. Actually, however, the engine power demand L2 is greater than the reference power L0 and the state of operation control of the motor generator 31 is maintained in the state S2. Therefore, the state of operation of the engine 15 is at the operating point E3, and the motor generator 31 produces a regenerative torque G from the operating point E3 to the pump power absorption P1. In this case, a regenerative torque G smaller than the required regenerative torque G2 is obtained (G<G2).

The motor generator 31 is required to produce a powering torque D1 as its operation if the engine power demand L is L1 when the pump power absorption P is P2. Actually, however, the engine power demand L1 is greater than the reference power L0 and the state of operation control of the motor generator 31 is maintained in the state S2. Therefore, the state of operation of the engine 15 is at the operating point E3, and the motor generator 31 produces a powering torque D from the operating point E3 to the pump power absorption P2. In this case, a powering torque D smaller than the required powering torque D1 is obtained (D<D1).

The motor generator 31 is required to produce a powering torque D2 as its operation if the engine power demand L is L2 when the pump power absorption P is P2. Actually, however, the engine power demand L2 is greater than the reference power L0 and the state of operation control of the motor generator 31 is maintained in the state S2. Therefore, the state of operation of the engine 15 is at the operating point E3, and the motor generator 31 produces a powering torque D from the operating point E3 to the pump power absorption P2. In this case, a powering torque D greater than the required powering torque D2 is obtained (D>D2).

The motor generator 31 is required to produce a regenerative torque G3 as its operation if the engine power demand L is L3 when the pump power absorption P is P2. Actually, however, the engine power demand L3 is greater than the reference power L0 and the state of operation control of the motor generator 31 is maintained in the state S2. Therefore, the state of operation of the engine 15 is at the operating point E3, and the motor generator 31 produces the powering torque D from the operating point E3 to the pump power absorption P2. In this case, a powering torque D is obtained instead of the required regenerative torque G3.

The pump power absorptions, the engine power demands, the operation demands to the motor generator 31, the torques (actual torques) of the motor generator 31, and the operation state of the engine 15 in the above-described five cases are shown in FIG. 7. As shown in FIG. 7, when the state of operation control of the motor generator 31 is the state S2, the state of operation of the engine 15 is at the operating point E3, and rotational speed control is performed for the motor generator 31 by the motor generator control unit 48. Therefore, the engine 15 produces the maximum torque, and the motor generator 31 produces a torque that realizes the target rotational speed Na*. As priority is given to these operations of the engine 15 and motor generator 31, the demand for regenerative operation or powering operation of the motor generator 31 is not met completely in most instances.

When the amount of charge to the battery 34 increases, the state of charge in the battery 34 becomes greater and the regeneration/powering power demand Q (regeneration power Qg) calculated by the regeneration/powering power demand calculation unit 46 decreases. The engine power demand L (=P−Q), therefore, becomes smaller than L0 (L<L0). Accordingly, the motor generator control unit 48 sets the target torque for the motor generator 31 at the powering torque, whereby a discharge operation by the battery 34 is performed. The state of charge in the battery 34 is thus controlled at the reference value.

When the load on the hydraulic pump 21 is high, the motor generator 31 performs a power assist to the engine 15 so that a discharge operation by the battery 34 increases. If the load on the hydraulic pump 21 decreases, however, the motor generator control unit 48 performs the rotational speed control of the motor generator 31 when the state of operation control of the motor generator 31 is the state S2. As a consequence, the motor generator 31 produces a regenerative torque from the operating point E3 to the pump power absorption P. If the load on the hydraulic pump 21 then decreases further and the state of operation control of the motor generator 31 changes from the state S2 to the state S1, the motor generator control unit 48 performs the torque control of the motor generator 31 to set the target torque for the motor generator 31 at the regenerative torque, whereby the state of charge in the battery 34 is controlled at the reference value.

Figure 8:
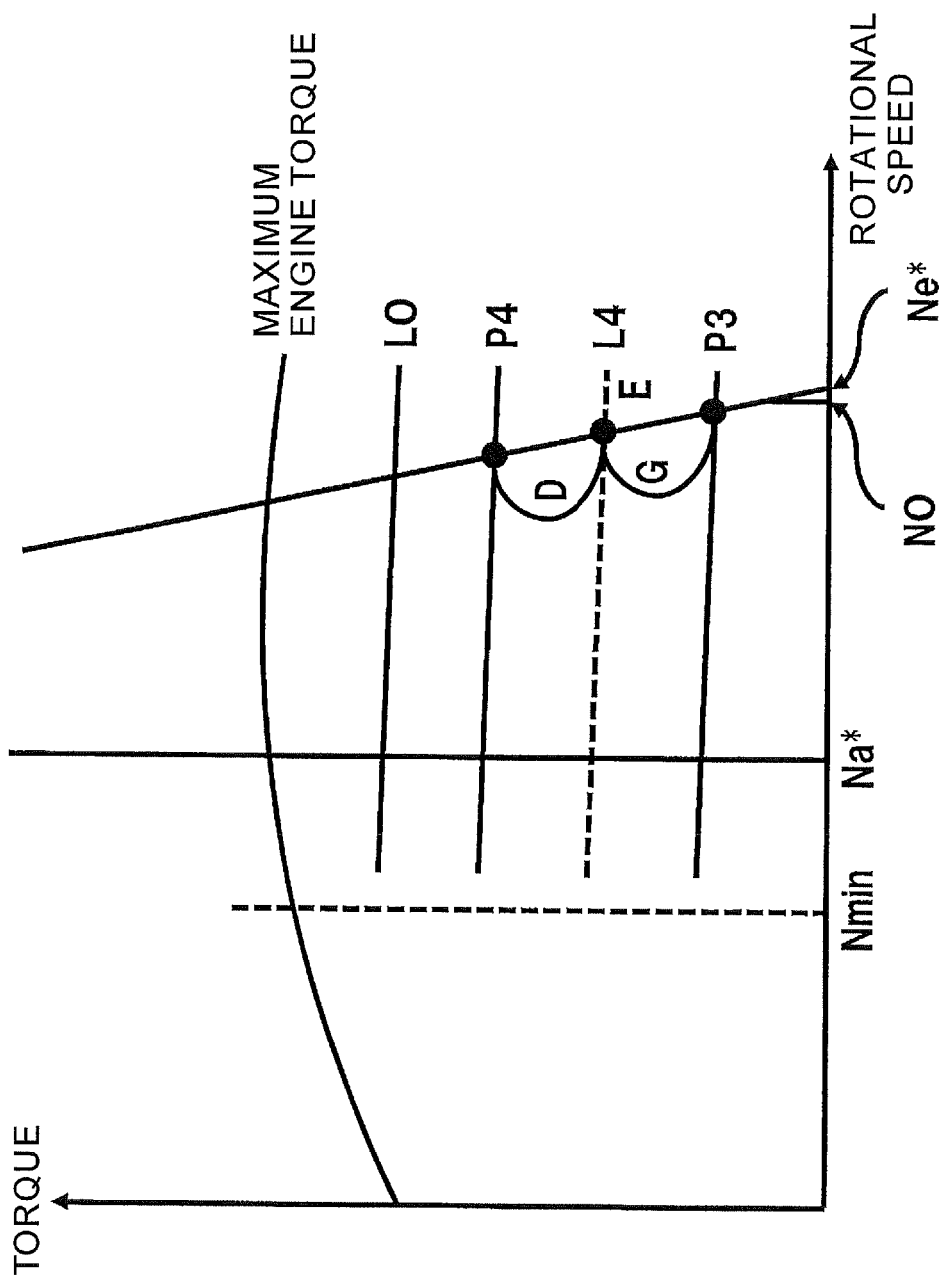
FIG. 8 is a diagram describing an operation of the motor generator when the state of operation control of the motor generator by the motor generator control unit in FIG. 3 is a state S1.

With reference to FIG. 8, a description will next be made in detail about an operation of the motor generator 31 when the state of operation control of the motor generator 31 is the state S1.

As the state of operation control of the motor generator 31 is the state S1, an engine power demand L4 shown in FIG. 8 is assumed to be smaller than the reference power L0 at which the switching of operation control of the motor generator 31 by the control switching unit 48A is performed. In addition, it is also assumed that a pump power absorption P3 is smaller compared with the engine power demand L4 and a pump power absorption P4 is greater compared with the engine power demand L4. It is to be noted that the following description indicates about the following two cases in which these engine power demand L4 and pump power absorptions P3,P4 are combined.

As illustrated in FIG. 8, the motor generator 31 is required to produce a regenerative torque G as its operation if the engine power demand L is L4 when the pump power absorption P is P3. Therefore, the motor generator control unit 48 sets the target torque for the motor generator 31 at the regenerative torque G from the engine power demand L4 to the pump power absorption P3, whereby the motor generator 31 generates the regenerative torque G.

The motor generator 31 is required to produce powering torque D as its operation if the engine power demand L is L4 when the pump power absorption P is P4. Therefore, the motor generator control unit 48 sets the target torque for the motor generator 31 at the powering torque D from the engine power demand L4 to the pump power absorption P4, whereby the motor generator 31 generates the powering torque D.

If an excessive powering torque is set in error as the target torque for the motor generator 31, the load on the engine 15, that is, the engine power demand L decreases, so that under the droop control by the engine controller 38, the rotational speed of the engine 15 increases and the torque of the engine 15 decreases. Even when the torque of the engine 15 decreases to 0, an over-speed that the rotational speed of the engine 15 increases beyond the target rotational speed Ne* for the engine 15 arises if the torque produced by the motor generator 31 is greater than a torque produced by a load on the hydraulic pump 21 and a drag of the hydraulic pump 21. Such an over-speed of the engine 15 applies an unnecessary load to the engine 15 and hydraulic pump 21, and therefore tends to become a cause of malfunction of the engine 15 and hydraulic pump 21.

In the first embodiment of the present invention, the motor generator control unit 48, therefore, decreases the target torque for the motor generator 31 when during the performance of the torque control, the rotational speed of the engine 15 has become higher than the second rotational speed N0 in a state that the target torque for the motor generator 31 has been set at the target torque corresponding to the powering operation, that is, the powering torque.

Figure 9:
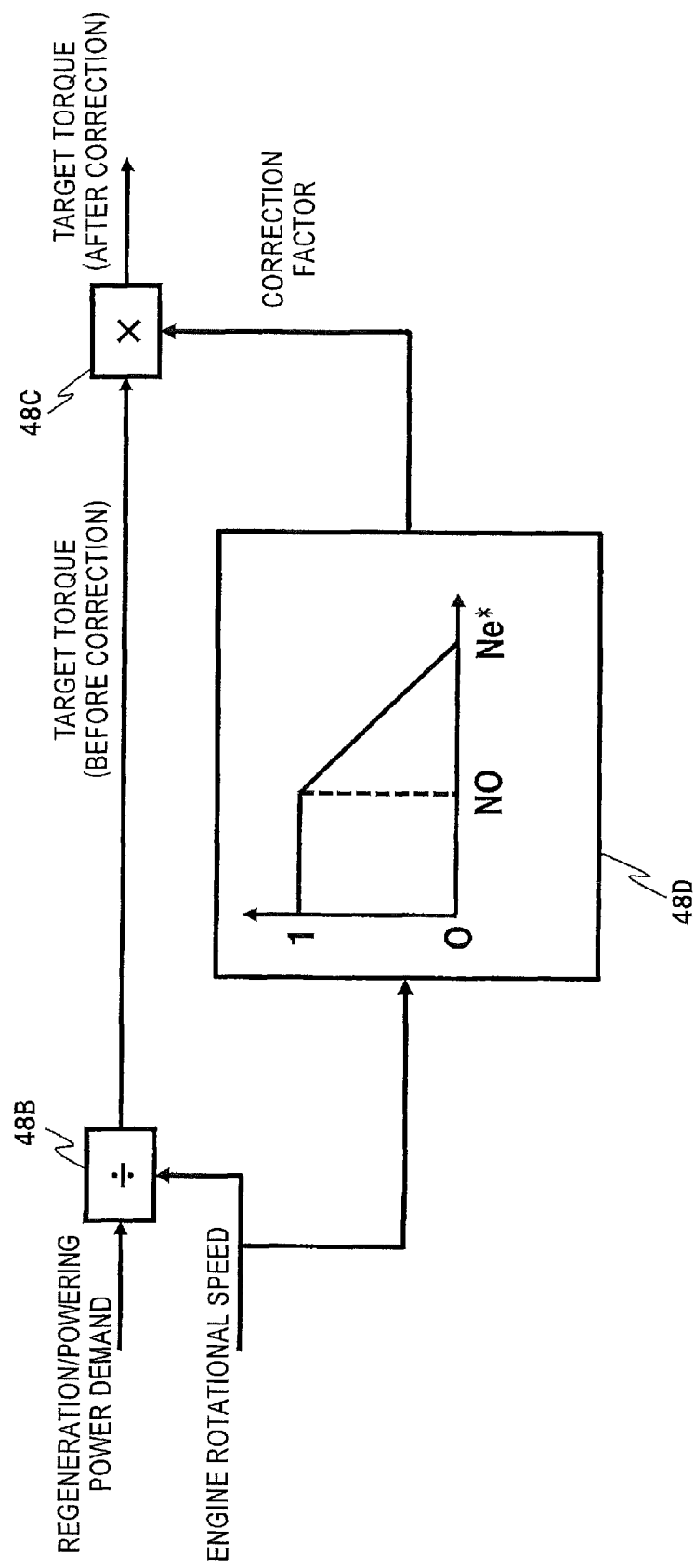
FIG. 9 is a block diagram illustrating a configuration relating to a correction of a target torque for the motor generator in the motor generator control unit in FIG. 3.

Described specifically, as illustrated in FIG. 9, the motor generator control unit 48 includes a target torque calculation unit 48B, a target torque correction unit 48C, and a correction map storage unit 48D. The target torque calculation unit 48B calculates the target torque for the motor generator 31 by dividing the generation/powering power demand Q, which has been calculated by the regeneration/powering power demand calculation unit 46, with the actual rotational speed detected by the rotational speed sensor 37. The target torque correction unit 48C corrects the target torque for the motor generator 31 by multiplying the target torque, which has been calculated by the target torque calculation unit 48B, with a correction factor. The correction map storage unit 48D contains a map, which represents a relationship between rotational speeds of the engine 15 and correction factors and has been stored beforehand.

In the map in the correction map storage unit 48D, the correction factor is set at 1 (the maximum value), for example, when the rotational speed of the engine 15 is lower than the rotational speed N0, the correction factor is in inverse proportion to the rotational speed of the engine 15 and is set at a value of 0 or greater but 1 or smaller, for example, when the rotational speed of the engine 15 is from the rotational speed N0 to the rotational speed Ne*, and the correction factor is set at 0 (the minimum value), for example, when the rotational speed of the engine 15 is higher than the rotational speed Ne*. It is to be noted that the rotational speed N0 is set at a rotational speed at which the engine 15 is in balance with a drag of the hydraulic pump 21, for example, when none of the control levers 24A1,24B1 and travel control pedal device are operated.

By applying the rotational speed, which has been detected by the rotational speed sensor 37, to the relationship between rotational speeds of the engine 15 and correction factors in the map, the correction map storage unit 48D determines the corresponding correction factor and outputs it to the target torque correction unit 48C. Accordingly, even if an excessive powering torque is set in error as the target torque for the motor generator 31, the target torque for the motor generator 31 decreases at the time point that the rotational speed of the engine 15 has become higher than the rotational speed N0. It is, therefore, possible to suppress the engine 15 from excessive rotation that would otherwise takes place by the occurrence of an extra torque from the motor generator 31. As a consequence, over-speed of the engine 15 can be prevented. Especially when the rotational speed of the engine 15 exceeds the rotational speed Ne*, the target rotational speed for the motor generator 31 is corrected to 0 by the target torque correction unit 48C and the torque to be produced by the motor generator 31 can be limited. The actual effectiveness of the prevention of an over-speed of the engine 15 can be enhanced, and malfunction of the engine 15 and hydraulic pump 21 can be sufficiently avoided.

According to the first embodiment of the present invention configured as described above, when during the performance of torque control by the motor generator control unit 48 (the state S1), the engine power demand L increases and the torque of the engine 15 increases to the maximum torque, the rotational speed of the engine 15 then decreases. When the rotational speed of the engine 15 becomes lower than the rotational speed Nmin, the control switching unit 48A switches the operation control of the motor generator 31 from the torque control to the rotational speed control, and as a result, the state of operation control of the motor generator 31 changes from the state S1 to the state S2. Owing to the production of a torque by the motor generator 31 based on the target rotational speed for the motor generator 31, the engine 15, therefore, can maintain the state of the maximum torque even if the rotational speed of the engine 15 fluctuates. Because fluctuations in the torque of the engine 15 as associated with fluctuations in the rotational speed of the engine 15 are allowed to remain small owing to the characteristics of the engine 15 as illustrated in FIG. 5, the rotational speed and torque of the engine 15 can be stabilized. As a consequence, it is possible to suppress the occurrence of hunting in the operation control of the engine 15, and therefore to improve the emission and fuel economy performance of the engine 15.

Second Embodiment

Figure 10:
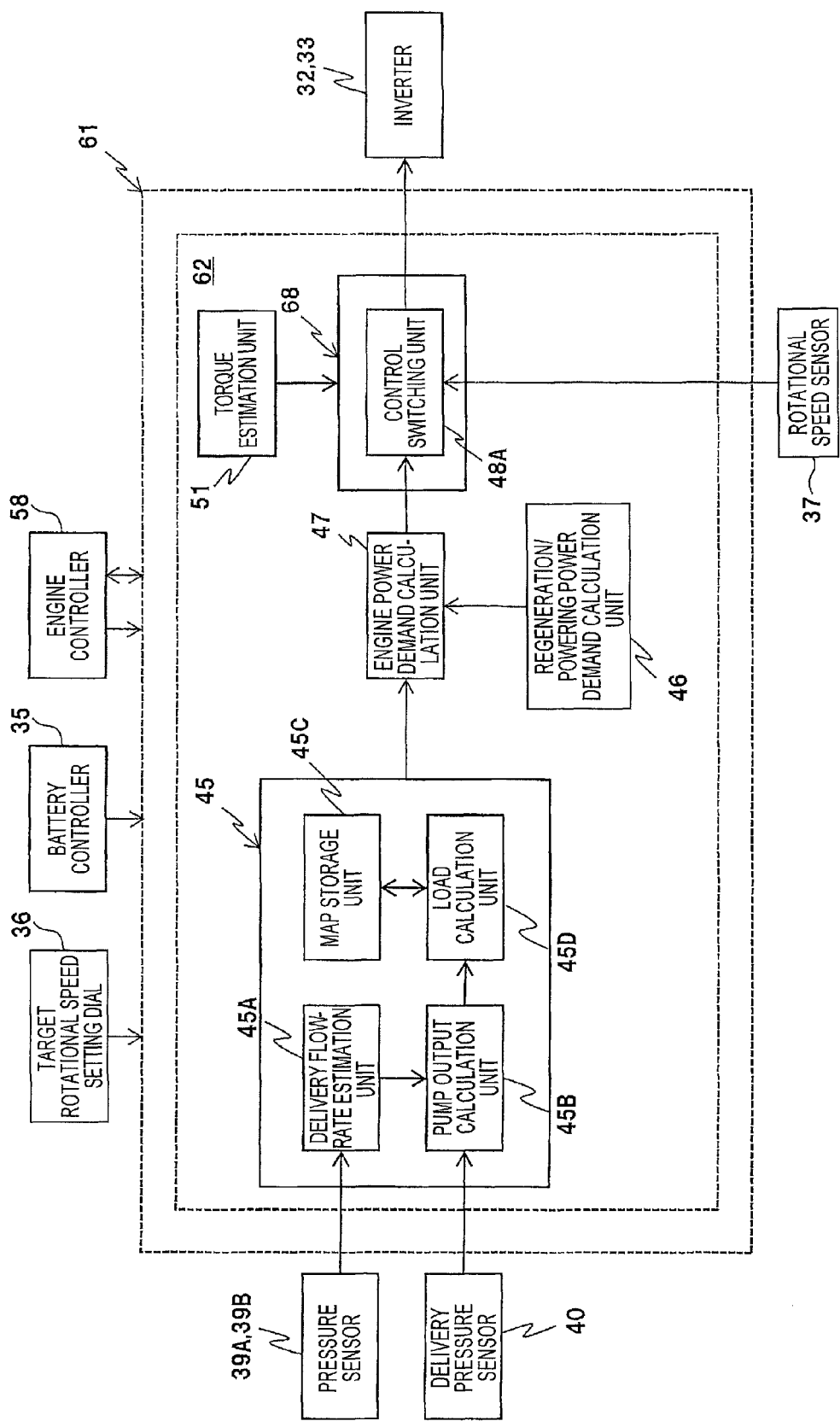
FIG. 10 is a block diagram illustrating the configuration of a control calculation circuit of a vehicle body controller in a hybrid hydraulic excavator according to a second embodiment of the present invention.
Figure 11:
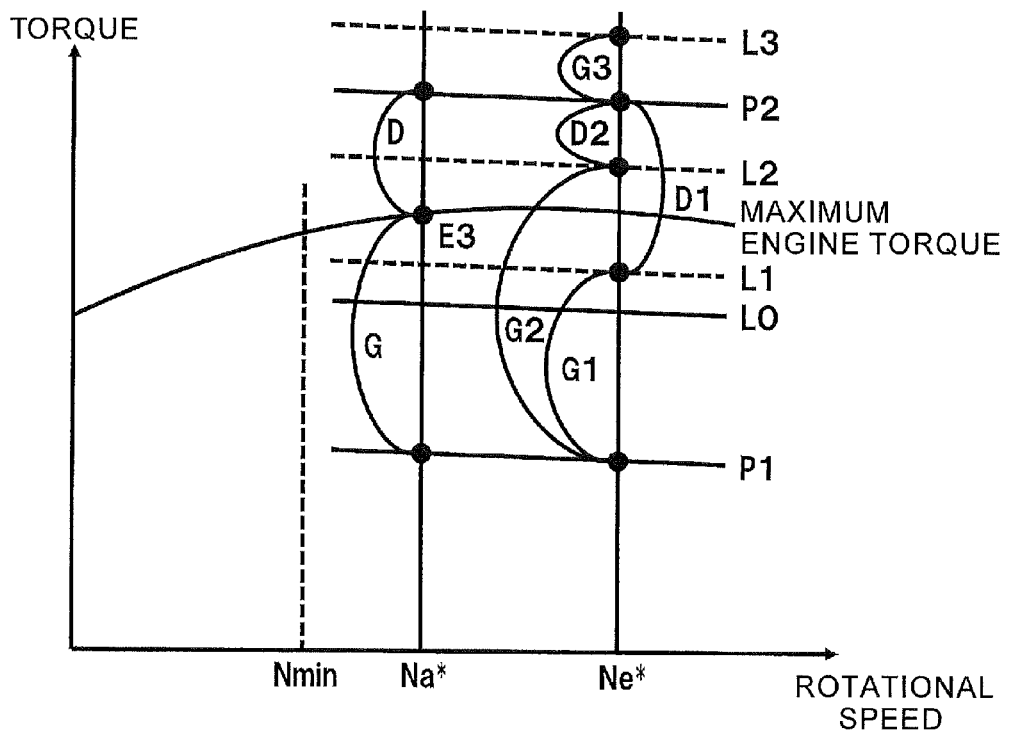
FIG. 11 is a diagram describing an operation of a motor generator when the state of operation control of the motor generator by a motor generator control unit in FIG. 10 is a state S2.

The second embodiment of the present invention is different from the above-described first embodiment in that as illustrated in FIG. 5, the engine controller 38 in the first embodiment operates the engine 15 with the governor characteristics such that the torque of the engine 15 increases at the predetermined inclination corresponding to reductions in the rotational speed of the engine 15 while as illustrated in FIG. 11, an engine controller 58 (see FIG. 10) in the second embodiment is configured to produce the torque of the engine 15 such that the rotational speed of the engine 15 coincides with the target rotational speed for the engine 15. In other words, the engine controller 58 performs so-called isochronous control as operation control of the engine 15.

In this case, even if the load on the hydraulic pump 21, in other words, the pump power absorption P increases, the target rotational speed Ne* for the engine 15 as set by the target rotational speed setting dial 36 and the actual rotational speed detected by the rotational speed sensor 37 substantially coincide with each other until the torque of the engine 15 reaches the maximum torque. It is the same as in the case of the above-described droop control that, as the pump power absorption P increases, the state of operation of the engine 15 changes along a maximum torque curve and the rotational speed of the engine 15 decreases. Concerning the operation of the motor generator 31 when the state of the operation control of the motor generator 31 is the state S2, it is hence similar to that in the above-described first embodiment, whereby irrespective of the operation control of the engine 15, the second embodiment can bring about similar advantageous effects as the above-described first embodiment.

Figure 12:
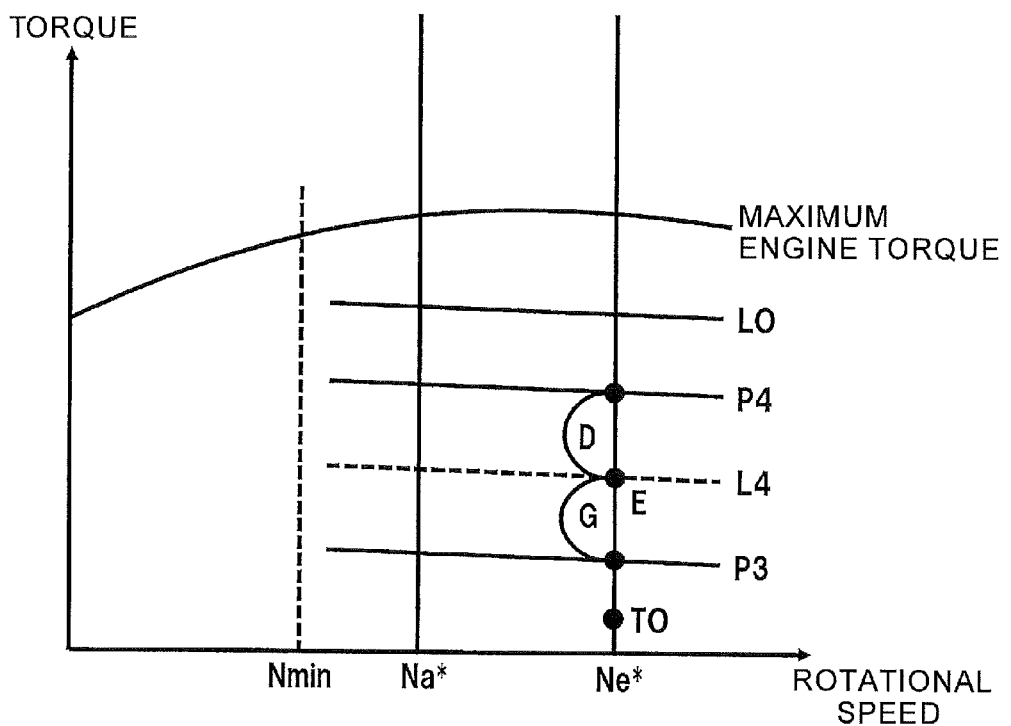
FIG. 12 is a diagram describing an operation of the motor generator when the state of operation control of the motor generator by the motor generator control unit in FIG. 10 is a state S1.

As to the operation of the motor generator 31 when the state of the operation control of the motor generator 31 is the state S1, on the other hand, the motor generator 31 is required, as illustrated in FIG. 12, to produce a regenerative torque G as its operation if the engine power demand L is L4 when the pump power absorption P is P3. By setting the target torque for the motor generator 31 at the regenerative torque G from the engine power demand L4 to the pump power absorption P3, a motor generator control unit 68 (see FIG. 10), therefore, allows the motor generator 31 to produce the regenerative torque G.

The motor generator 31 is required to produce a powering torque D as its operation if the engine power demand L is L4 when the pump power absorption P is P4. By setting the target torque for the motor generator 31 at the powering torque D from the engine power demand L4 to the pump power absorption P4, the motor generator control unit 68, therefore, allows the motor generator 31 to produce the powering torque D.

With respect to the operation of the motor generator 31 when the state of the operation control of the motor generator 31 is the state S1, it is hence similar to that in the above-described first embodiment as mentioned above, whereby irrespective of the operation control of the engine 15, the second embodiment can bring about similar advantageous effects as the above-described first embodiment. The rotational speed of the engine 15 substantially coincides, irrespective of the pump power absorption P, with the target rotational speed Ne* under the isochronous control by the engine controller 58. In regard to the correction of the target torque for the motor generator 31 according to the second embodiment of the present invention, a configuration different from that in the above-mentioned first embodiment is applied accordingly.

Figure 13:
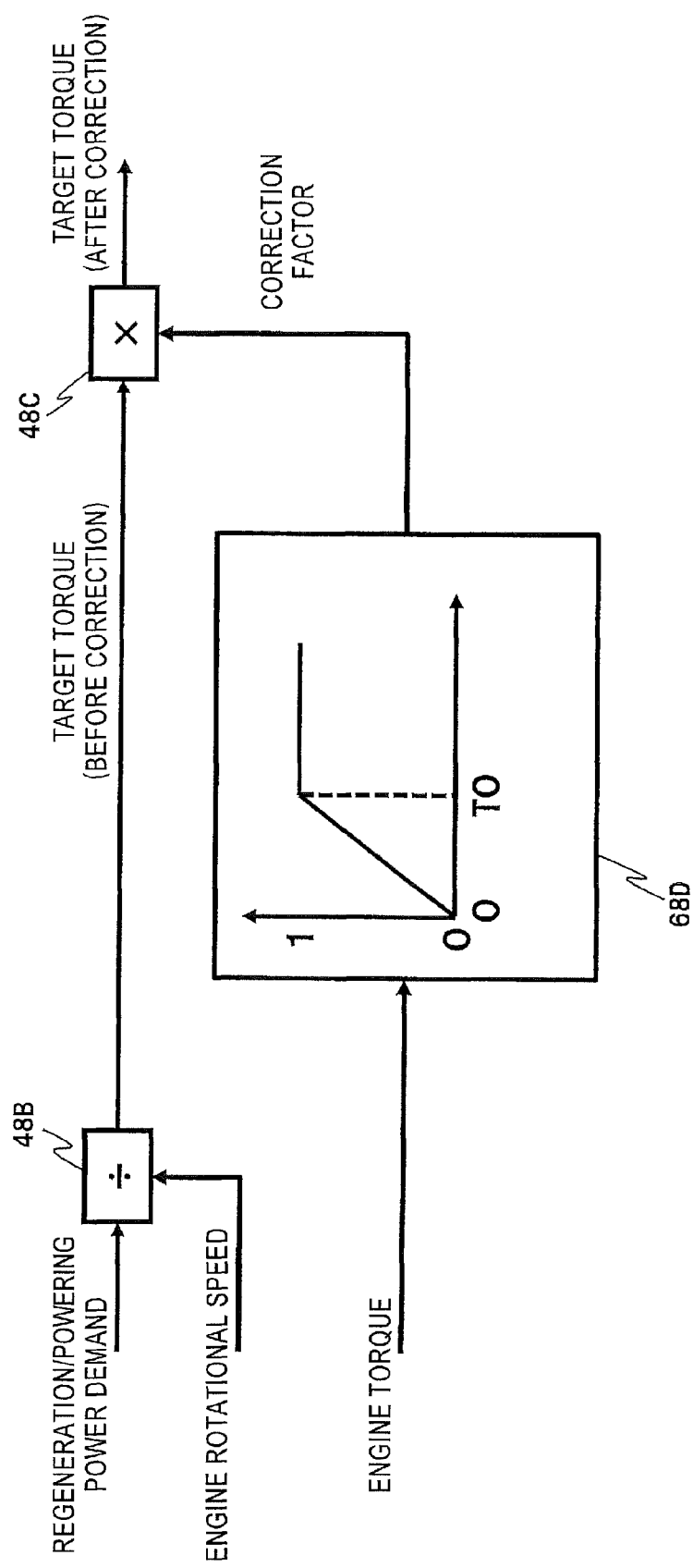
FIG. 13 is a block diagram illustrating a configuration relating to a correction of a target torque for the motor generator in the motor generator control unit in FIG. 10.

As illustrated in FIG. 10, for example, a control calculation circuit 62 in a vehicle body controller 61 is provided with a torque estimation unit 51 that estimates the torque of the engine 15, and during the performance of the torque control (the state S1), the motor generator control unit 68 decreases the target torque for the motor generator 31 when the torque estimated by the torque estimation unit 51 becomes smaller than a predetermined torque T0 in the state that the target torque for the motor generator 31 has been set at the target torque corresponding to the powering operation, that is, the powering toque. Described specifically, the motor generator control unit 68 in the second embodiment of the present invention includes, as illustrated in FIG. 13, a correction map storage unit 68D, in which a map that represents a relationship between torques of the engine 15 and correction factors has been stored beforehand, in place of the correction map storage unit 48D in the above-mentioned first embodiment.

In the map in the correction map storage unit 68D, the correction factor is set at 1 (the maximum value), for example, when the torque of the engine 15 is greater than the torque T0, and the correction factor is in direct proportion to the torque of the engine 15 and is set at a value of 0 or greater but 1 or smaller, for example, when the torque of the engine 15 is from 0 to the torque T0. It is to be noted that the torque T0 is set at a torque at which the engine 15 is in balance with a drag of the hydraulic pump 21, for example, when none of the control levers 24A1,24B1 and travel control pedal device are operated. By applying the torque, which has been estimated by the torque estimation unit 51, to the relationship between torques of the engine 15 and correction factors in the map, the correction map storage unit 68D determines the corresponding correction factor and outputs it to the target torque correction unit 48C. As the remaining configuration of the second embodiment of the present invention is similar to that of the first embodiment, the overlapping description is omitted, and the same reference signs are applied to the same elements as in the configuration of the first embodiment.

According to the second embodiment of the present invention configured as described above, similar advantageous effects as in the above-mentioned first embodiment are obtained. In addition, even if an excessive powering torque is set in error as the target torque for the motor generator 31, the target torque for the motor generator 31 decreases at the time point that the torque of the engine 15 has become smaller than the torque T0. It is, therefore, possible to suppress the engine 15 from excessive rotation that would otherwise takes place by the occurrence of an extra torque from the motor generator 31. As a consequence, over-speed of the engine 15 can be prevented. Especially when the torque estimated by the torque estimation unit 51 becomes 0, the target torque for the motor generator 31 as estimated by the torque estimation unit 51 is corrected to 0 by the target torque correction unit 48C and the torque to be produced by the motor generator 31 can be limited. The actual effectiveness of the prevention of an over-speed of the engine 15 can be enhanced, and malfunctions of the engine 15 and hydraulic pump 21 can be sufficiently avoided.

It is to be noted that the above-described embodiments are described in detail to facilitate the understanding of the present invention, and therefore shall not be limited to those provided with the entire configurations, respectively. Further, a part of the configuration of one of the embodiments can be substituted for the corresponding part of the configuration of the other embodiment, and a part of the configuration of one of the embodiments can be added to the configuration of the other embodiment.

As the construction machines of these embodiments, the hybrid hydraulic excavator 1 has been described. However, the construction machines of these embodiments are not limited to such a case, and may be construction machines such as hybrid wheel loaders.

The invention claimed is:

1. A construction machine comprising:
    an engine;
    a motor generator that performs a power assist to the engine and electricity generation;
    an electrical storage device that performs a transfer of electric power with the motor generator;
    a hydraulic pump that is driven by the engine and motor generator;
    a rotational speed sensing device that detects an actual rotational speed of the engine;
    an engine controller that performs, based on the actual rotational speed of the engine as detected by the rotational speed sensing device and a target rotational speed for the engine, control to produce a torque from the engine; and
    a vehicle body controller that controls an operation of a vehicle body, wherein
        the vehicle body controller is configured to:
            estimate a pump power absorption that is a power absorption by the hydraulic pump,
            according to a state of charge in the electrical storage device, calculate a regeneration/powering power demand that is a power demand for a regenerative operation or powering operation of the motor generator,
            calculate an engine power demand that is a power demand to the engine based on the pump power absorption and the regeneration/powering power demand, and
            perform rotational speed control, which makes the motor generator generate a torque based on a target rotational speed for the motor generator according to the engine power demand and the actual rotational speed of the engine, or torque control, which makes the motor generator generate a torque based on a target torque for the motor generator;

switch from the torque control to the rotational speed control when during the performance of the torque control, in a state of a maximum torque of the engine, the engine power demand increases and the actual rotational speed of the engine becomes lower than a predetermined first rotational speed, and switch from the rotational speed control to the torque control when the power demand becomes smaller than a reference power that is set to be smaller than the maximum torque of the engine during the performance of the rotational speed control.

2. The construction machine according to claim 1, wherein the vehicle body controller is configured to set the target rotational speed for the motor generator at a rotational speed lower than the target rotational speed for the engine during the performance of the rotational speed control.

3. The construction machine according to claim 1, wherein the engine controller is configured to allow the engine to operate with governor characteristics that correspond to a reduction in the rotational speed of the engine, the torque of the engine increases at a predetermined inclination; and the vehicle body controller is configured to decrease the target torque for the motor generator when during the performance of the torque control, the actual rotational speed of the engine becomes higher than a predetermined second rotational speed in a state that the target torque for the motor generator is set at a target torque corresponding to a powering operation.

4. The construction machine according to claim 1, wherein the engine controller is configured to allow the engine to produce a torque such that the rotational speed of the engine comes into coincidence with the target rotational speed for the engine; and the vehicle body controller is configured to decrease the target torque for the motor generator when during the performance of the torque control, the estimated torque becomes smaller than the predetermined torque in a state that the target torque for the motor generator is set at a target torque corresponding to a powering operation.

* * * * *